(12) United States Patent
Forghani-Zadeh et al.

(10) Patent No.: US 10,324,877 B2
(45) Date of Patent: Jun. 18, 2019

(54) CIRCUIT AND METHOD FOR INTERFACING UNIVERSAL SERIAL BUS

(71) Applicant: Texas Instruments Incorporated, Dallas, TX (US)

(72) Inventors: Hassan Pooya Forghani-Zadeh, Fort Worth, TX (US); Byungchul Jang, Allen, TX (US); Erick Torres, Austin, TX (US); Timothy Bryan Merkin, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 897 days.

(21) Appl. No.: 14/930,680

(22) Filed: Nov. 3, 2015

(65) Prior Publication Data

US 2016/0188514 A1  Jun. 30, 2016

Related U.S. Application Data

(60) Provisional application No. 62/096,704, filed on Dec. 24, 2014.

(51) Int. Cl.

| | | |
|---|---|---|
| *H03K 17/16* | (2006.01) | |
| *G06F 13/38* | (2006.01) | |
| *G06F 1/3287* | (2019.01) | |
| *G06F 13/42* | (2006.01) | |
| *G06F 1/26* | (2006.01) | |
| *G06F 1/3234* | (2019.01) | |

(52) U.S. Cl.
CPC ............ *G06F 13/385* (2013.01); *G06F 1/266* (2013.01); *G06F 1/3253* (2013.01); *G06F 1/3287* (2013.01); *G06F 13/4282* (2013.01); *Y02D 10/14* (2018.01); *Y02D 10/151* (2018.01); *Y02D 10/171* (2018.01)

(58) Field of Classification Search
CPC ...... G06F 13/385; G06F 1/3253; G06F 1/266; G06F 13/4282; G06F 1/3287; Y02D 10/171; Y02D 10/151; Y02D 10/14
USPC .......................................................... 326/21
See application file for complete search history.

(56) References Cited

U.S. PATENT DOCUMENTS

| | | | | |
|---|---|---|---|---|
| 2012/0049829 A1* | 3/2012 | Murakami | ............... | H02M 1/32 323/288 |
| 2013/0179603 A1* | 7/2013 | Tu | ........................... | G06F 13/00 710/15 |

(Continued)

OTHER PUBLICATIONS

"USB Charging Port Controller and Power Switch with Load Detection", Texas Instruments, TPS2546, SLVSbJ2A, Feb. 2013, Revised Feb. 2013, 40 pgs.

(Continued)

*Primary Examiner* — Don P Le
(74) *Attorney, Agent, or Firm* — Michael A. Davis, Jr.; Charles A. Brill; Frank D. Cimino

(57) ABSTRACT

USB controllers, systems and methods are presented to conserve power in a USB controller, in which a transmitter transmits data to a line of a connected USB cable according to a transmit data signal, and a pull down circuit selectively sinks current from a supply node of the transmitter when the transmit data signal is in a first state, refrains from sinking the first current from the supply node when the transmit data signal is in a different second state.

25 Claims, 4 Drawing Sheets

(56) References Cited

U.S. PATENT DOCUMENTS

| | | | | |
|---|---|---|---|---|
| 2013/0181660 A1* | 7/2013 | Zhou | ..................... | H02J 7/0052 |
| | | | | 320/107 |
| 2014/0157012 A1* | 6/2014 | Uchida | ................... | G06F 1/266 |
| | | | | 713/300 |
| 2015/0145560 A1* | 5/2015 | Ghosh | ................ | G06F 13/4068 |
| | | | | 326/56 |
| 2016/0225559 A1* | 8/2016 | Ueki | ....................... | G06F 1/266 |
| 2017/0344098 A1* | 11/2017 | Abu Hilal | ............. | G06F 1/3287 |
| 2017/0344508 A1* | 11/2017 | Setiawan | ............ | G06F 13/4282 |

OTHER PUBLICATIONS

"Universal Serial Bus Power Delivery Specification", Revision 2.0, V1.0, Aug. 11, 2014, Section 2—Overview, cover sheet and pp. 41-56.
"Universal Serial Bus Power Delivery Specification", Revision 2.0, V1.0, Aug. 11, 2014, Section 5—Physical Layer, pp. 102-140.
"Universal Serial Bus Power Delivery Specification", Revision 2.0, V1.0, Aug. 11, 2014, Section 6—Protocol Layer, pp. 141-207.
"Universal Serial Bus Power Delivery Specification", Revision 2.0, V1.0, Aug. 11, 2014, Section 8—Device Policy, Part 1 (pp. 268-350) and Part 2 (pp. 351-450).
"Universal Serial Bus Type-C Cable and Connector Specification", Revision 1.0, Aug. 11, 2014, USB 3.0 Promoter Group, Part 1 (pp. 1-84) and Part 2 (pp. 85-171).

* cited by examiner

CIRCUIT AND METHOD FOR INTERFACING UNIVERSAL SERIAL BUS

REFERENCE TO RELATED APPLICATION

Under 35 U.S.C. § 119, this application claims priority to, and the benefit of, U.S. provisional patent application Ser. No. 62/096,704, entitled "LOW-IDDQ SCHEME FOR POWERING USB TYPE-C BASEBAND TRANSCEIVER", and filed on Dec. 24, 2014, the entirety of which is hereby incorporated by reference.

TECHNICAL FIELD

The present disclosure relates to Universal Serial Bus (USB) technology and more specifically to USB interface circuits.

BACKGROUND

USB ports and cables allow interconnection of a variety of compatible electronic devices, such as desktop computers, automobile dashboard consoles and battery-powered portable devices such as laptop computers, tablets, mobile phones, e-readers and MP3 players. USB ports are accessed using standardized USB cable connections to provide serial communications between devices, as well as electrical power transfer for charging and operating battery-powered peripheral devices. USB compatible systems often include interface integrated circuits (ICs) mounted to an internal circuit board to interface USB data and power connections to host system circuitry such as power circuits and host processors. Dedicated USB charging devices are also available having multiple USB ports for charging various portable devices, which may include circuitry for fast charging certain peripheral devices. Many desktop and laptop computers include multiple USB ports for data transfer and/or peripheral device charging. USB power delivery (USB-PD) and Type-C (USB-C) specifications describe delivery of higher power over USB cables and connectors to provide a universal power plug for devices that may accommodate more than 5V charging power, for example, for fast or quick-charging capabilities. The USB-PD specification defines communications for negotiating voltage and current levels for power transfer from a source port to a sink port, where the power negotiation communications is independent from the normal USB communications.

USB-PD defines four kinds of USB compatible devices: Provider-Only, Provider/Consumer, Consumer/Provider, and Consumer-Only. Devices that are Provider-Only, Provider/Consumer, or Consumer/Providers may sometimes be in a Source role—meaning they are providing DC voltage on the Vbus wire for the far-end device to consume or sink. USB-C recognizes three kinds of USB devices: downward facing port (DFP), upward facing port (UFP), and dual-role port (DRP). In the absence of USB PD messaging, the DFP is the source of power and the UFP is sinking the power. USB-C cables and connectors include configuration channel (CC) lines for power configuration as well as for baseband communications. USB-PD specifications provide baseband communications using Biphase Mark Coding (BMC) for message exchange over a configuration channel (CC) wire or line of the USB cable. USB-C systems use a Type-C plug with two configuration channel lines CC1 and CC2. The USB-PD specification defines a half-duplex packet-based communication link between ports connected via a USB-PD cable and connectors to exchange information that enables the two ports to communicate and negotiate the voltage and current provided from a Source port to a Sink port. The ports can negotiate to switch roles (Source to Sink and vice versa). The BMC communications on the CC lines is independent from the normal USB communications that go through D+ and D− lines of the USB cable.

The CC line or lines may also be used for negotiating power transfer configurations of connected devices by way of analog signal levels. For example, up to 15 W of power can be delivered for USB Type-C cables without USB-PD messaging by controlling the DC voltage on the CC pin. The nominal voltage of the CC line is determined by pull up current from the DFP device (e.g., using a pull up resistor RP or a current source) and a pull down resistor RD (or pull down current source) from the UFP device. The CC line voltage value can thus vary from 0.3V to 2.4V in many instance due to combinations of the pull up and pull down levels. However, the baseband communication signals on the CC lines for typical BMC data packet exchange range from 0 to 1.1V. Consequently, the power supplies used for USB-C transmitters require pull down current to avoid having RP/RD combination charge up the baseband transmitter power supply node when a BMC output logic "1" is transmitted by the baseband transceiver. This is due to the CC line connection through the baseband transmitter to the supply that powers the transmitter. If inadequate pull down current is provided, and particularly if long duration transitions occur, the baseband transmit output can eventually be charged up and the transmit signals can go outside acceptable levels. For example, reverse current can be as high as 350 uA when a 47 kΩ pull up resistor and 3.3V supply are used. Accordingly, improved USB port controllers and techniques are desired to ensure robust baseband communications without excessive power consumption.

SUMMARY

Disclosed examples include USB controllers, systems and methods to conserve USB controller power, in which a pull down circuit selectively sinks a first current from a supply node of the transmitter in a first mode when the transmit data signal is in a first state, and refrains from sinking the first current from the supply node in a second mode when the transmit data signal is in a second state. The pull down circuit in certain examples is enabled when a baseband transmit (TX) signal is logic 1, and the pull down is off during bus idle time and when the TX data is 0. In some examples, the amount of pull down current is adjustable and may be programmed based on power configuration data available through cable detect comparators. In certain examples a second pull down circuit sinks a second pull down current from the transmitter supply node in the first and second modes. The disclosed examples reduce power consumption of a low dropout (LDO) regulator or other transmit supply circuit, allowing use of efficient class A LDO supply circuitry with the selective pull down capability to prevent significant CC line charge up and enhance reliable baseband communications in a variety of USB power configurations. Disclosed examples further include methods of conserving power in a USB controller, including providing communication between a USB controller and an associated USB cable using a transmitter to transmit data on a line of the USB cable according to a transmit data signal, delivering a voltage signal from a supply circuit to a supply node of the transmitter. The method further include selectively sinking a first current from the supply node when the transmit data signal is in a first state, and refraining from sinking the first current from the supply node when the transmit data signal is in a different second state.

DETAILED DESCRIPTION

Figure 1:
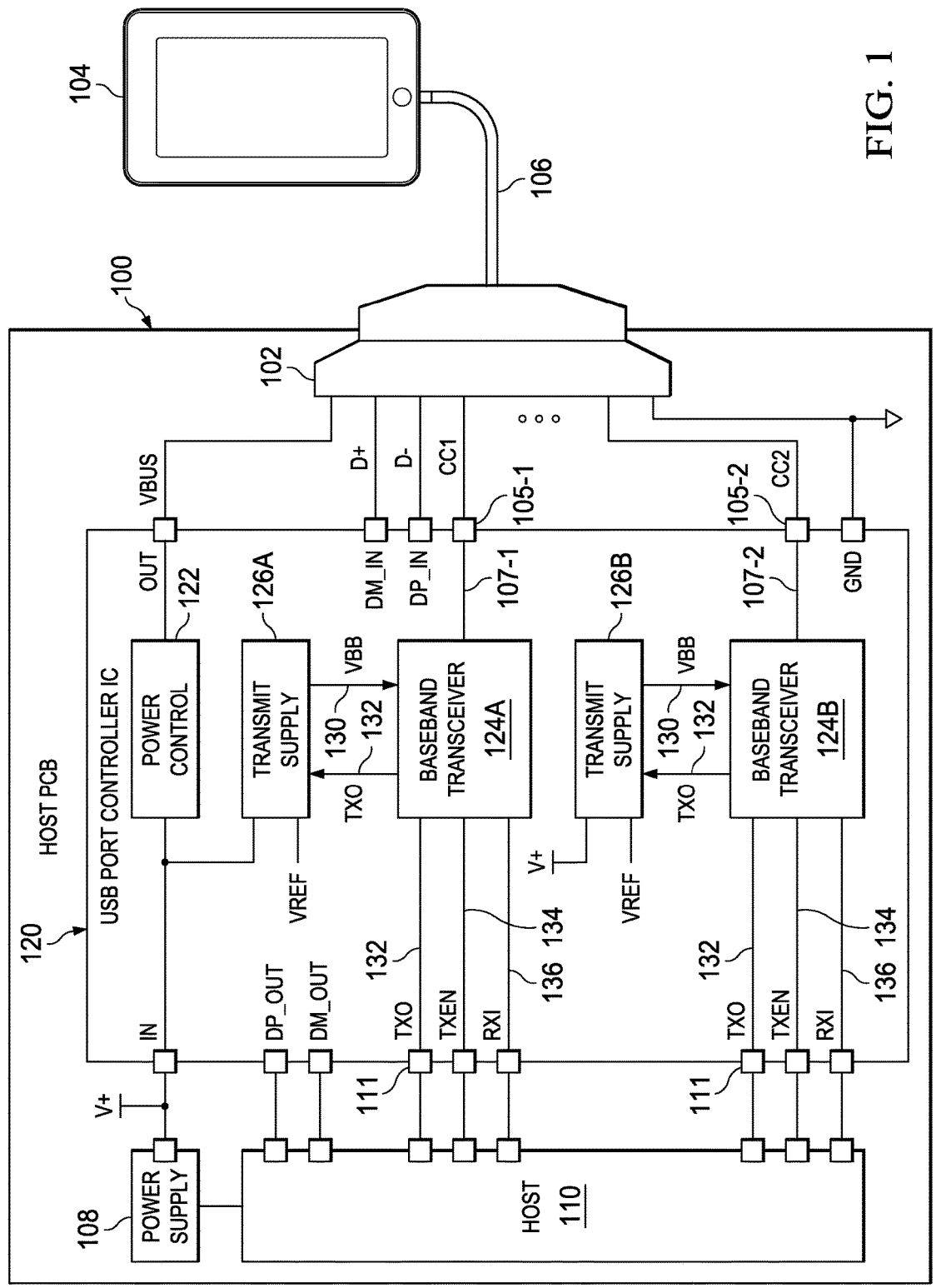
FIG. 1 is a schematic diagram of a host printed circuit board with a host processor and a USB port controller interfacing with a USB compatible device, including transmit supply circuits and baseband receivers for configuration channel signal lines.

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . " Also, the term "couple" or "couples" is intended to include indirect or direct electrical connection or combinations thereof. For example, if a first device couples to or is coupled with a second device, that connection may be through a direct electrical connection, or through an indirect electrical connection via one or more intervening devices and connections.

Figure 2:
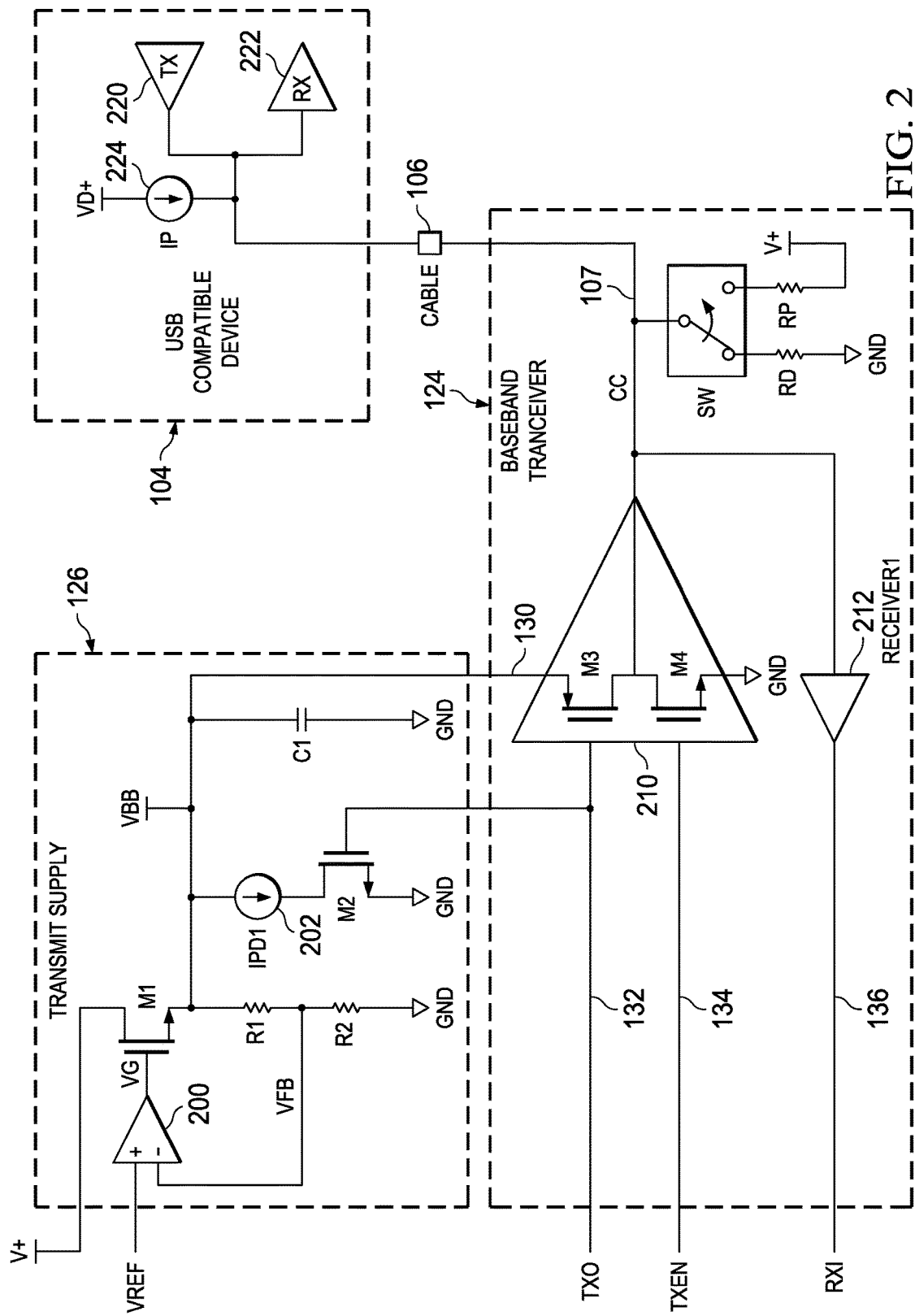
FIG. 2 is a schematic diagram of a baseband transceiver transmit supply circuit with a low dropout (LDO) transmit supply including a first pull down current source selectively activated according to the baseband transmit buffer operating state.

Referring initially to FIGS. 1 and 2, FIG. 1 shows a USB host system implemented using a host printed circuit board (PCB) 100 including various circuitry implementing a USB power delivery (USB-PD) system. The host system 100 controls power transfer between the host PCB 100 and a USB compatible device 104 using an associated USB cable 106, and a USB port controller integrated circuit (IC) 120. The host PCB 100 in one example includes a USB-C port connector 102 associated with a corresponding USB port and a host processor 110. The USB controller 120 in one example includes a first terminal 105 to electrically couple the output of a baseband transmitter 210 (FIG. 2) with a CC line 107 of the USB cable 106, and a second terminal 111 to electrically couple the transceiver transmitter 210 with the host processor 110 to receive a transmit data signal TXO from the host processor 110.

The host processor 110 and the controller IC 120 are powered by a power supply 108 that provides a positive voltage V+ to a first voltage node IN of the controller 120. The controller IC 120 also includes a power control circuit 122 connected to a bus voltage line VBUS of the USB connector 102 via an output terminal OUT of the IC 120. The controller IC 120 further includes two baseband transceiver circuits 124A and 124B and associated transmit supply circuits 126A and 126B. The transmit supply circuits 124 each receive input voltage V+ from the first supply node IN as well as a reverence voltage signal VREF. The supply circuits 124 provide or deliver a voltage signal VBB (e.g., a baseband transmit supply voltage signal) to a supply node 130 to power a transmitter 210 (FIG. 2) of the associated baseband transceiver circuit 124. The transmitter 210 includes an output to transmit data to the CC line 107 of the USB cable 106 according to a transmit data signal TXO from the host processor 110, and a supply node 130 to supply power to the transmitter 210.

In one example, the host processor 110 is a programmable or programmed processor operable when powered to execute instructions stored in an associated electronic memory (not shown) to negotiate USB power delivery parameters with the associated USB compatible devices 104 connected to corresponding port connectors 102 via a USB cables 106. In other examples, the host 110 can be any suitable processor, logic circuit, or combination thereof, whether implemented as a single circuit (e.g., integrated circuit or IC) or as multiple circuits. In one example, the host system 100 provides DP_OUT and DM_OUT connections from the controller 120 to the host processor 110 and the USP controller 120 provides DM_IN and DP_IN terminals to connect to the D+ and D1 lines of the connector 102 and the associated USB cable 106. Using these connections, the host processor 110 sends and receives data packets via D+ and D− lines of the cable 106. In addition, the USB controller 120 in one example includes terminals 111A and 111B for transmit output (TXO) connections, transmit enable (TXEN) connections and receive input (RXI) connections to the host processor 110 to implement baseband communications via one or both of the configuration channel terminals 105-1 and 105-2 and corresponding lines 107-1 and 107-2 (CC1 and CC2) of the associated USB cable 106. The individual baseband transceiver circuits 126 include a supply node 130 along with a transmit data line 132 (TXO), a transmit enable line 134 (TXEN) and a receive data line 136. The TXO transmit data line 132 in one example is connected to the associated transmit supply circuit 126 for selective pull down current sinking operation as detailed further below. The controller IC 120 also provides a ground terminal GND for connection to a ground line of the USB cable 102.

Figure 3:
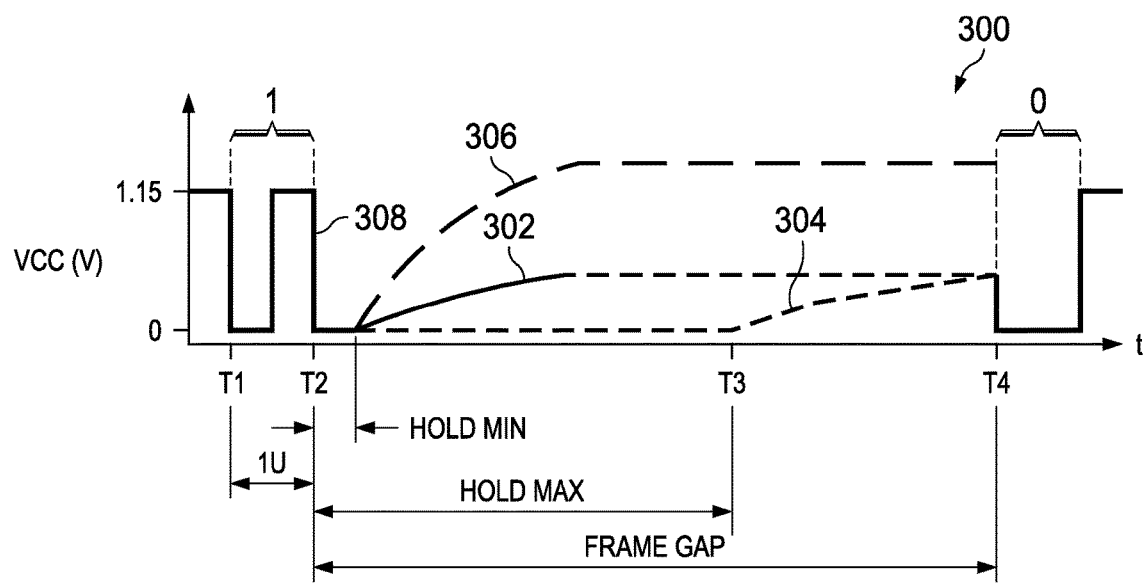
FIG. 3 is a graph of configuration channel line voltage as a function of time for transmission of BMC encoded frames ending with a high logic "1" and terminated with a high-to-low transition where the pull up/pull down charging of the configuration channel line voltage exceeds 1.15V.

Referring to FIGS. 2 and 3, FIG. 2 shows one example baseband transceiver 124 and an associated transmit supply circuit 126 of the controller IC 120 of FIG. 1. Any suitable transmit supply circuit 126 can be used that delivers a voltage signal VBB to the supply node 130 of the transceiver 124 for powering an associated transmitter circuit 210. In one example, the supply circuit 126 provides a class A low dropout (LDO) regulator, including a first transistor (e.g., an n-channel field effect transistor or BET) M1 coupled between the first voltage node V+ and the supply node 130, with a gate control terminal coupled to receive a control signal VG. The first transistor M1 controls the conductivity of the drain-source channel to deliver the baseband transmitter supply voltage signal VBB to the supply node 130 according to the gate control signal VG. The supply circuit 126 also includes a feedback circuit formed by resistors R1 and R2 coupled in series between the supply node 130 and a constant voltage node (e.g., GND) to deliver a feedback voltage signal VFB at a node joining R1 and R2. The feedback signal VFB represents the voltage of the supply node 130. A difference amplifier circuit 200 compares the feedback voltage signal VFB with a reference voltage signal VREF. The output of the amplifier 200 provides the control signal VG to the gate of the transistor M1 according to the difference or error between VFB and VREF to control the gate terminal of the first transistor M1 to regulate the voltage signal VBB delivered to the supply node 130. An output stabilizing capacitor C1 is coupled between the supply node 130 and GND. In this example, the transmit supply circuit 126 is a class A LDO regulator, with the closed-loop feedback operation of the first transistor M1 providing pull up regulation to prevent downward deviations of the voltage signal VBB from the regulation point determined by the reference voltage signal VREF. It is noted that providing a class AB regulator would provide pull down regulation to prevent upward excursions of the voltage signal VBB, but this approach would add further cost and increase power consumption in the supply circuit 126.

The baseband transceiver 124 in FIG. 2 includes a transmitter 210 including a CMOS inverter output formed by third and fourth transistors M3 (P-channel FET) and M4 (N-channel NET). The transceiver 124 further includes a receiver amplifier 212 212 with an input connected to the CC line 107, and the receiver amplifier 212 provides a receive input signal RXI on the line 136 for use by the host processor 110 (FIG. 1). The transmitter 200 is enabled by a high TXEN signal from the host processor 110 on the line 134, and transmits an outgoing signal to the CC line 107 according to the transmit data signal TXO on the line 132. The host processor 110 (e.g., FIG. 1) may provide frame data for transmission by the transmitter 200 by any suitable means, including a transmit output buffer (not shown). For a transmitter output in a first state (e.g., HI, denoted herein as logic "1"), the upper transmitter transistor M3 is turned on, and M4 is turned off. This connects the CC line 107 to the transmitter supply node 130. For transmitter output data in a second state (e.g., LO or logic "0"), M3 is off and M4 is on, and the CC line 107 is essentially at GND potential.

In the first transmitter data state of TXO, the transmitter 210 turns on M3 and causes the voltage of the CC line 107 to be approximately VBB. However, due to the pull up and pull down features of the USB-C connection through the cable 106, inadequate pull down capabilities of the host system 100 and the USB port controller 120 can lead to the capacitor C1 charging up during the transmission of transmit data in the first state. As seen in FIG. 2, the USB compatible device 104 includes a pull up current source 224 delivering a current signal from a positive device supply VD+ to the CC line 107. The device 104 also includes a transmit amplifier (TX) 220 and a receive amplifier (RX) 222. In other implementations, the pull up features of the USB compatible device 104 can be implemented by a pull-up resistor (not shown). As also shown in FIG. 2, the port controller IC 120 includes circuitry allowing configuration of the baseband transceiver 124 in order to implement pull up or pull down capabilities for interfacing with a variety of different USB compatible device interconnections. In one example, a switch SW is connected to the CC line 107, and allows connection of the CC line to GND through a pull down resistor RD, or connection of the CC line 107 to a first reference node V+ through a pull up resistor RP. In the example interconnection of FIG. 2, the switch SW connects the CC line 107 to GND through RD, while the connected USB compatible device 104 provides pull up current IP to the CC line 107 from the current source 224.

FIG. 3 provides a graph 300 showing the voltage on the CC line 107 as a function of time for baseband transmission of a BMC encoded frame ending with a high logic "1" from time T1 to time T2, terminated with a high-to-low transition including a trailing edge 308 at time T2. In this example, no auxiliary pull down circuit is used in the transmit supply circuit 126. The first transmit frame transmission in this example is followed by a frame gap before transmission of a subsequent BMC frame starting at time T4. In this example, the BMC transmission range is from 0V to approximately 1.15V for reliable receipt by a connected USB device 104 (FIG. 2). For a minimum "HOLD" time after the termination of the initial BMC encoded frame, the CC line voltage rises along curve 302 Where the RP/RD is above 1.15V. For a maximum "HOLD" time (T3-T2) following the initial frame termination, the voltage of the CC line 107 follows curve 304, and rises from time T3 to time T4. In these examples, the excess pull up capacity of the associated USB device 104 raises the CC line voltage above 0V, but does not interfere with successful BMC baseband communications for signal states of 0V and 1.15V. However, where the pull up strength of the connected USB compatible device 104 is significantly higher than the pull down capability of the USB controller 120 with respect to the CC line 107, the CC line voltage may write significantly, as shown by curve 306 and FIG. 3. For example, where the connected device 104 has a pull-up resistor of 47 k Ω connected to a 3.3V supply, reverse current can be as high as 350 uA, leading to charging up of the capacitor C1, raising the voltage on the CC line 107 beyond the normal BMC communications voltage range.

In order to address the potential for undesired charging of the stabilizing capacitor C1, the supply circuit 126 also includes a first pull down circuit with a pull down current source 202 and a second transistor M2 transistor (e.g., an n-channel field effect transistor or FET). The pull down circuit 202, M2 selectively provides a first pull down current IPD1 according to the baseband transmit buffer operating state represented by the state of the transmit data signal TXO on line 132 of the baseband transceiver 124. The first pull down circuit in FIG. 2 includes a first current source 202 and second transistor M2 coupled in series with the current source 202 between the supply node 130 and the constant voltage node GND. The first current source 202 sinks the first current IPD1 from the supply node 130 through M2 when M2 is turned on. The gate control signal of M2 in this example is controlled by the TXO transmit data signal online 132. Thus, when the TXO signal is HI (logic "1"), M2 is in a first mode (e.g., conductive) to allow the current source 202 to sink the first current IPD1 from the supply node 130. Otherwise, M2 operates in a second mode to prevent the current source 202 from sinking the first current IPD1 from the supply node 130 when the transmit data signal TXO is in the second state LO (e.g., logic "0"). In this manner, the pull down capabilities of the first pull down circuit 202, M2 is selectively employed in an intelligent, power-efficient manner according to the TXO signal state, allowing use of a cost-effective class A LDO transmit supply circuit 126, while mitigating or avoiding the adverse effects of pull up/pull down mismatch with respect to the voltage of the CC line 107. Consequently, baseband communication is facilitated along the CC line 107, without unduly consuming excessive amounts of power in operation of the USB controller 120. Moreover, the disclosed examples enhance the communications robustness without the added cost and circuit space associated with providing a class AB regulator as the transmit supply circuit 126.

Various embodiments are possible in which the selective pull down circuit is tailored for a specific implementation, either programmatically or through adjustment of the amount of pull down current IPD1. In one possible implementation, IPD1 is preferably set to a current level slightly higher than the pull up current IP provided by the connected USB compatible device 104. In this manner, the pull up regulation of the LDO regulator of the transmit supply circuit 126 will ensure that VBB does not fall significantly below the desired value set by the reference voltage signal VREF, and the first pull down current IPD 1 ensures that VBB does not rise significantly above that value.

Figure 4:
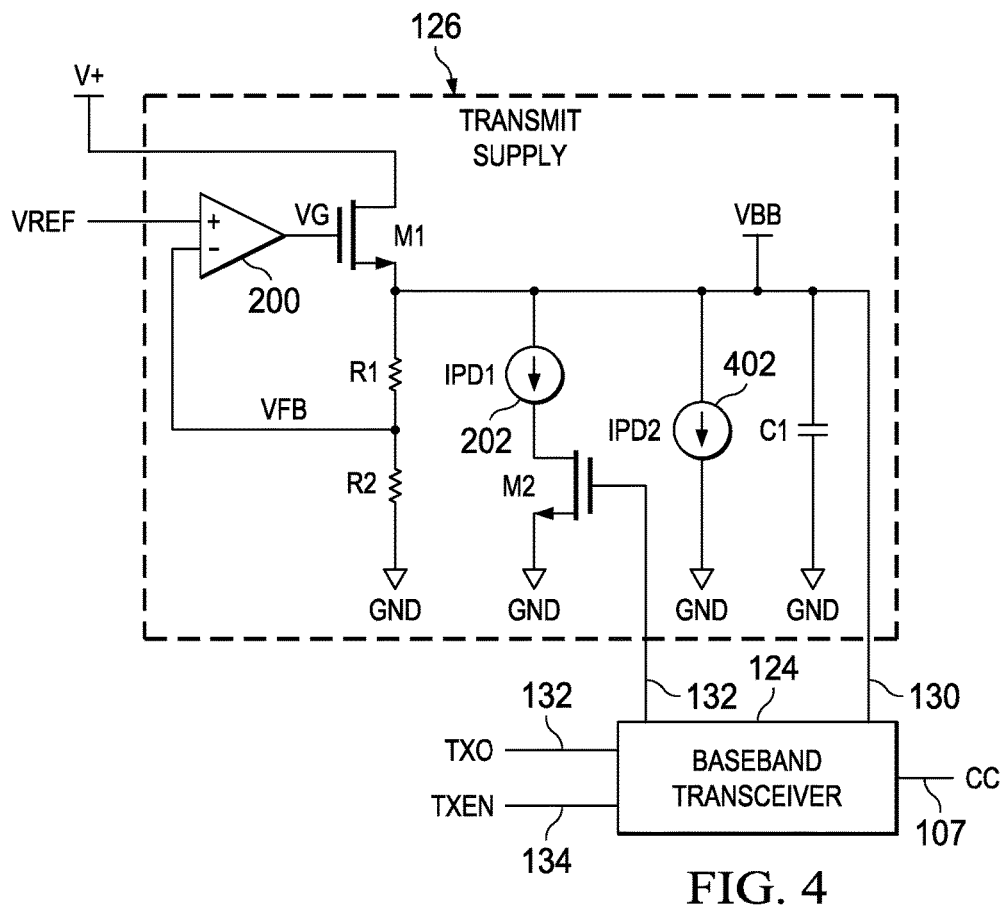
FIG. 4 is a schematic diagram of a baseband transceiver transmit supply circuit including a selectively activated first LDO pull down current source and a fixed second LDO pull down current source.

FIG. 4 shows another a baseband transceiver transmit supply circuit example 126 including a selectively activated first LDO pull down current source 202 and transistor M2 as described above, along with a fixed second LDO pull down current source 402 coupled between the supply node 130 and the constant voltage node GND. In this case, the second current source 402 operates in the first and second modes to sink a second current IPD2 from the supply node 130 independent of the state of the TXO transmit data signal. The second current source acts in conjunction with the first current source 202 to sink current in excess of the connected USB device pull up current source 224 when the TXO transmit data signal is HI to mitigate or prevent charge up of the CC line voltage, thereby facilitating successful transmission of outgoing BMC-encoded packets by the baseband transceiver 124.

Figure 5:
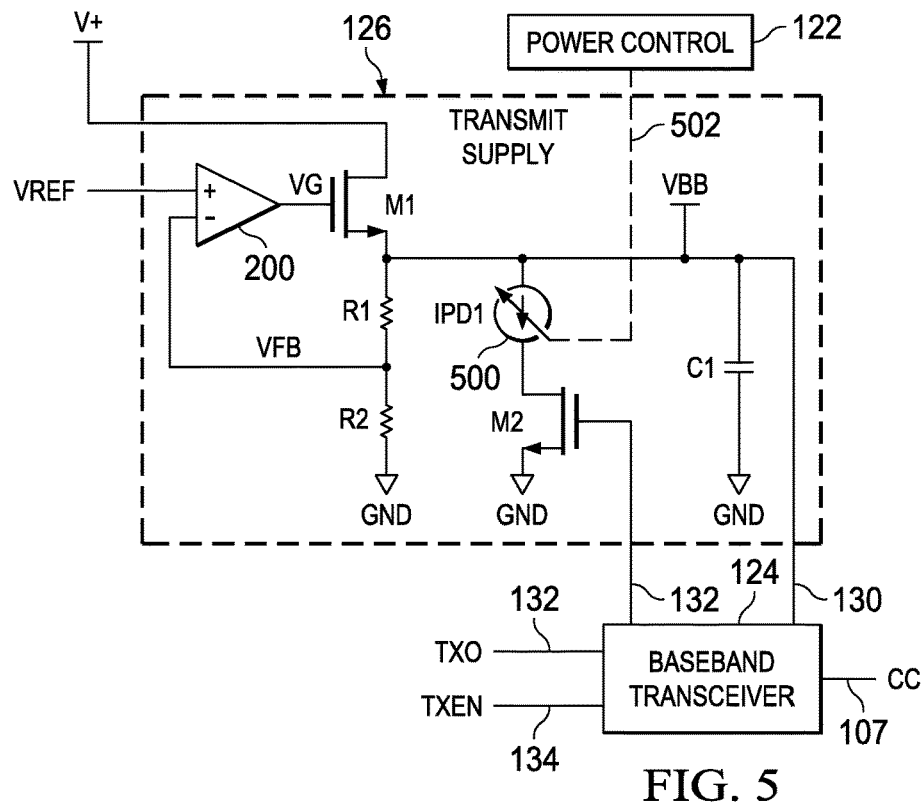
FIG. 5 is a schematic diagram of a baseband transceiver transmit supply circuit including an adjustable LDO pull down current source controlled according to power configuration settings of the USB port controller.

FIG. 5 show yet another baseband transceiver supply circuit example 126, in this case including an adjustable LDO pull down current source 500 connected in series with the second transistor M2 between the supply node 130 and GND. The current source 500 in this example sinks the first current IPD1 from the supply node 130 at an adjustable current level when the transmit data signal TXO is in the first state HI, and refrains from sinking current from the supply node 131 the TXO signals in the second state LO. In one possible implementation, the power control circuit 122 of the USB controller 120 (e.g., FIG. 1) provides one or more control signals or values 502 in order to adjust the pull down current value IPD1 according to power configuration settings of the USB port controller 120. In this regard, negotiation between the host system 100 and the associated USB compatible device 104 (e.g., through baseband communications and/or through analog signal leveling on the CC line 107, or through other suitable means) establishes the power transfer/charging levels used by the USB port, including information from which the power control circuit 122 can determine or estimate the level of pull up capacity provided by the USB compatible device 104. In certain examples, the power control circuit 122 sets the adjustable pull down current level IPD1 of the first current source 500 according to this power configuration data, preferably to be slightly above the amount of pull up capacity of the connected USB device 104, thereby combating voltage rise on the CC line 107 while mitigating excessive power dissipation by the USB controller 120. Moreover, the example of FIG. 5 (e.g., like the example of FIG. 2) turns off the pull down effect of the current source 500 via the transistor M2 except during HI state TXO signal transmission, by which the pull down power consumption of the transmit supply circuit 126 is mitigated when not needed.

Figure 6:
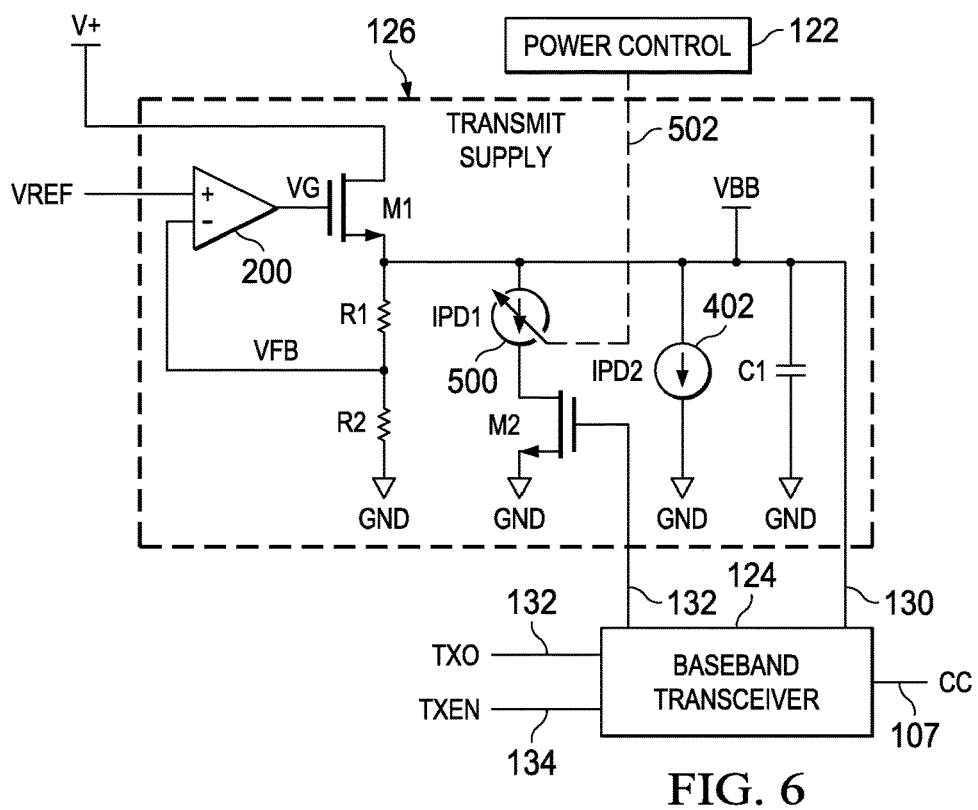
FIG. 6 is a schematic diagram of a baseband transceiver transmit supply circuit including an adjustable first LDO pull down current source and a fixed second LDO pull down current source.

FIG. 6 illustrates another transmit supply circuit example 126 including an adjustable first LDO pull down current source 500 as described above in connection with FIG. 5, along with a fixed second LDO pull down current source 402 connected between the supply node 130 and GND. As in the example of FIG. 4 above, the second pull down current source 402 operates in both the first and second modes, and in the first mode, operates in conjunction with the first current source 202 when the TXO signal is in the HI state to provide sufficient pull down current sinked from the supply node 130 to mitigate or avoid overcharging of the CC line voltage, thereby facilitating baseband communications with the connected USB compatible device 104 via the associated USB cable 106.

Disclosed examples further include a method of conserving power in a USB controller, which can be implemented in the described controller 120 or other USB port controllers. The method includes providing communication between a USB controller 120 and an associated USB cable 106 using a transmitter 210 to transmit data on a line 107 of the USB cable 106 according to a transmit data signal TXO. In certain embodiments, such as described above, the provided communications can be BMC-encoded packet exchange through the baseband configuration control lines 107. In other embodiments, the method may be employed with respect to other USB cable lines, and communications thereon. The methods further include delivering a voltage signal (e.g., supply voltage signal VBB above) from a supply circuit (e.g., supply circuit 126) to a supply node 130 of the transmitter 210. The methods also include selectively sinking a first current IPD1 from the supply node 130 when the transmit data signal TXO is in a first state HI, and refraining from sinking the first current IPD1 from the supply node 130 when the transmit data signal TXO is in a different second state LO. In certain examples, the first current is selectively synced from the supply node 130 by selectively connecting a first current source 202 between the supply node 130 and a constant voltage node GND when the transmit data signal TXO is in the first state HI, and disconnecting the first current source 202 from the supply node 130 or from the constant voltage node GND to refrain from sinking current from the supply node when the transmit data signal TXO is in the second state LO. In further embodiments, the method includes sinking a second current IPD2 from the supply node 130 in the first and second modes, for example, using a second pull down current source 402 as shown in FIGS. 4 and 6 above. Moreover, certain implementations of the method include adjusting an amplitude of the first current EPD1 according to power configuration data associated with the USB controller 120, for example, using an adjustable first pull down current source 500 as seen in FIGS. 5 and 6 above, where the amplitude may be adjusted in certain embodiments according to power configuration data associated with the USB controller 120.

As seen above, the disclosed examples facilitate low-cost, low power solutions to enhance the robustness of baseband and other communications via USB cables, finding utility in USB-C and other USB interconnection configurations, without adding significant cost or circuit space to USB controllers 120. Moreover, the described examples provide adaptability for a large number of different pull up/pull down configurations of interconnected USB compatible devices 100, 104. In certain implementations, the selective pull down circuitry is enabled when by the baseband TXO signal is logic 1, and the pull down is off during bus idle time and when the TXO data is 0. In some examples, the amount of pull down current is adjustable and may be programmed based on power configuration data available through cable detect comparators and/or from data supplied by a host processor 110. By these solutions, IPD1 and/or the combination of IPD1 and IPD2 provided by any included second pull down current source 402 can be disabled and/or reduced in the modes where voltage set by RP/RD is guaranteed to be lower than 1.15V in certain examples.

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims.

The following is claimed:

1. A universal serial bus (USB) controller for interfacing a host processor with an associated USB cable, the USB controller comprising:
    a transmitter with an output to transmit data to a line of the USB cable according to a transmit data signal, and a supply node to supply power to the transmitter;
    a supply circuit to deliver a voltage signal to the supply node of the transmitter; and
    a first pull down circuit coupled between the supply node and a constant voltage node, the first pull down circuit selectively operative in a first mode to sink current from the supply node when the transmit data signal is in a first state, the first pull down circuit selectively operative in a second mode to refrain from sinking current from the supply node when the transmit data signal is in a different second state.

2. The USB controller of claim 1, wherein the output of the transmitter is operative to transmit data to a configuration channel line of the USB cable according to the transmit data signal.

3. The USB controller of claim 2, wherein the supply circuit comprises a class A low dropout regulator, including:
    a first transistor coupled between a first voltage node and the supply node, the first transistor operative to deliver the voltage signal to the supply node according to a control signal;
    a feedback circuit coupled between the supply node and the constant voltage node to deliver a feedback voltage signal according to a voltage of the supply node; and
    an amplifier to deliver the control signal according to a difference between the first transistor according to the feedback voltage signal and a reference voltage signal to regulate the voltage signal delivered to the supply node.

4. The USB controller of claim 3, wherein the first pull down circuit includes:
    a current source; and
    a second transistor coupled in series with the current source between the supply node and the constant voltage node, the second transistor operative in the first mode to allow the current source to sink a first current from the supply node when the transmit data signal is in the first state, the second transistor operative in the second mode to prevent the current source from sinking the first current from the supply node when the transmit data signal is in the second state.

5. The USB controller of claim 4, comprising a second current source coupled between the supply node and the constant voltage node, the second current source operative in the first and second modes to sink a second current from the supply node.

6. The USB controller of claim 5, wherein the first current source is adjustable, the first current source operative to sink the first current from the supply node at an adjustable current level when the transmit data signal is in the first state.

7. The USB controller of claim 4, wherein the first current source is adjustable, the first current source operative to sink the first current from the supply node at an adjustable current level when the transmit data signal is in the first state.

8. The USB controller of claim 1, comprising a second pull down circuit coupled between the supply node and the constant voltage node, the second pull down circuit operative in the first and second modes to sink a second current from the supply node.

9. The USB controller of claim 8, wherein the first pull down circuit is adjustable, the first pull down circuit operative to sink a first current from the supply node at an adjustable current level when the transmit data signal is in the first state.

10. The USB controller of claim 9, comprising a power control circuit to control at least one power level of the USB controller, wherein the first pull down circuit is operative to sink the first current from the supply node at the adjustable current level according to power configuration data from the power control circuit.

11. The USB controller of claim 1, wherein the first pull down circuit is adjustable, the first pull down circuit operative to sink a first current from the supply node at an adjustable current level when the transmit data signal is in the first state.

12. The USB controller of claim 11, comprising a power control circuit to control at least one power level of the USB controller, wherein the first pull down circuit is operative to sink the first current from the supply node at the adjustable current level according to power configuration data from the power control circuit.

13. The USB controller of claim 1, wherein the USB controller is an integrated circuit with a first terminal to electrically couple the output of the transmitter with a line of the USB cable, and a second terminal to electrically couple the transmitter with the host processor to receive the transmit data signal from the host processor.

14. The USB controller of claim 1, wherein the first pull down circuit is operative in the first mode to sink current from the supply node when the transmit data signal is in a high first state, and to refrain from sinking current from the supply node when the transmit data signal is in a low second state.

15. A method of conserving power in a USB controller, the method comprising:
    providing communication between a USB controller and an associated USB cable using a transmitter to transmit data on a line of the USB cable according to a transmit data signal;
    delivering a voltage signal from a supply circuit to a supply node of the transmitter;
    when the transmit data signal is in a first state, selectively sinking a first current from the supply node; and
    when the transmit data signal is in a different second state, refraining from sinking the first current from the supply node.

16. The method of claim 15, wherein selectively sinking the first current from the supply node includes selectively connecting a first current source between the supply node and a constant voltage node when the transmit data signal is in the first state; and wherein refraining from sinking the first current from the supply node includes disconnecting the first current source from the supply node or from the constant voltage node when the transmit data signal is in the second state.

17. The method of claim 15, further comprising sinking a second current from the supply node in the first and second modes.

18. The method of claim 17, further comprising adjusting an amplitude of the first current according to power configuration data associated with the USB controller.

19. The method of claim 15, further comprising adjusting an amplitude of the first current according to power configuration data associated with the USB controller.

20. A universal serial bus (USB) host system for interfacing USB compatible devices, the host system comprising:
   a USB port connector associated with a corresponding USB port of the host system to communicate with an external USB compatible device through an associated USB cable;
   a host processor; and
   a USB controller to interface the host processor with the USB cable, the USB controller comprising:
      a transmitter with an output to transmit data to a line of the USB cable according to a transmit data signal from the host processor, and a supply node to supply power to the transmitter,
      a supply circuit to deliver a voltage signal to the supply node of the transmitter, and
      a first pull down circuit coupled between the supply node and a constant voltage node, the first pull down circuit selectively operative in a first mode to sink current from the supply node when the transmit data signal is in a first state, the first pull down circuit selectively operative in a second mode to refrain from sinking current from the supply node when the transmit data signal is in a different second state.

21. The USB host system of claim 20, wherein the output of the transmitter is operative to transmit data to a configuration channel line of the USB cable according to the transmit data signal.

22. The USB host system of claim 20, wherein the first pull down circuit includes:
   a current source; and
   a second transistor coupled in series with the current source between the supply node and the constant voltage node, the second transistor operative in the first mode to allow the current source to sink a first current from the supply node when the transmit data signal is in the first state, the second transistor operative in the second mode to prevent the current source from sinking the first current from the supply node when the transmit data signal is in the second state.

23. The USB host system of claim 20, comprising a second pull down circuit coupled between the supply node and the constant voltage node, the second pull down circuit operative in the first and second modes to sink a second current from the supply node.

24. The USB host system of claim 20, wherein the first pull down circuit is adjustable, the first pull down circuit operative to sink a first current from the supply node at an adjustable current level when the transmit data signal is in the first state.

25. The USB host system of claim 20, wherein the first pull down circuit is operative in the first mode to sink current from the supply node when the transmit data signal is in a high first state, and to refrain from sinking current from the supply node when the transmit data signal is in a low second state.

* * * * *